US007020177B2

(12) United States Patent
Leeper et al.

(10) Patent No.: US 7,020,177 B2
(45) Date of Patent: Mar. 28, 2006

(54) METHOD AND APPARATUS TO TRANSFER INFORMATION

(75) Inventors: David G. Leeper, Scottsdale, AZ (US); David G. England, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 262 days.

(21) Appl. No.: 10/263,364

(22) Filed: Oct. 1, 2002

(65) Prior Publication Data

US 2005/0020206 A1 Jan. 27, 2005

(51) Int. Cl.
*H04B 1/69* (2006.01)

(52) U.S. Cl. ...................... 375/130; 375/146; 375/135; 375/295; 375/259; 375/367; 375/150; 370/335; 370/342; 704/207; 704/213; 455/42; 455/46; 455/47

(58) Field of Classification Search ................. 455/41; 375/150, 259, 146, 367; 704/207, 213
See application file for complete search history.

(56) References Cited

U.S. PATENT DOCUMENTS

| | | | | |
|---|---|---|---|---|
| 5,677,927 | A | 10/1997 | Fullerton et al. | |
| 5,963,581 | A * | 10/1999 | Fullerton et al. | 375/131 |
| 5,995,534 | A * | 11/1999 | Fullerton et al. | 375/146 |
| 6,031,862 | A * | 2/2000 | Fullerton et al. | 375/146 |
| 6,122,323 | A * | 9/2000 | Johnson | 375/259 |
| 6,127,955 | A * | 10/2000 | Handel et al. | 341/120 |
| 6,219,635 | B1 * | 4/2001 | Coulter et al. | 704/207 |
| 6,351,652 | B1 | 2/2002 | Finn et al. | |
| 6,381,261 | B1 * | 4/2002 | Nagazumi | 375/138 |
| 6,421,389 | B1 | 7/2002 | Jett et al. | |
| 6,505,032 | B1 * | 1/2003 | McCorkle et al. | 455/41.2 |
| 6,611,223 | B1 * | 8/2003 | Low et al. | 341/157 |
| 6,735,238 | B1 * | 5/2004 | McCorkle | 375/130 |
| 6,751,444 | B1 * | 6/2004 | Meiyappan | 455/69 |
| 6,804,192 | B1 * | 10/2004 | Marchok et al. | 370/210 |
| 2001/0019312 | A1 | 9/2001 | Joe | |

FOREIGN PATENT DOCUMENTS

WO WO 02/052740 A1 12/2001

OTHER PUBLICATIONS

Harold F. Engler, Jr., Georgia Tech Research Institute, Atlanta, GA, “Systems Considerations for Large Percent-Bandwidth Radar” IEEE 1991, pps 0133-0137.

* cited by examiner

*Primary Examiner*—Marceau Milord
(74) *Attorney, Agent, or Firm*—James S. Finn

(57) ABSTRACT

Briefly, in accordance with an embodiment of the invention, a method and apparatus to transfer information is provided, wherein the method includes transferring information between at least two wireless devices using a waveform that includes a first sinusoidal signal and a second sinusoidal signal, wherein the second sinusoidal signal has more zero-crossings than the first signal and wherein a duration of the first sinusoidal signal is less than a duration of the second sinusoidal signal.

29 Claims, 6 Drawing Sheets

700

METHOD AND APPARATUS TO TRANSFER INFORMATION

BACKGROUND

Today's wireless communication systems may employ many different types of apparatuses and methods to wirelessly transfer information. Determining the appropriate architectures and air interface protocols to transfer information in a particular system may be problematic. Factors such as cost, power consumption, reuse of spectrum, bandwidth, data rate, distance, and system capacity may be considered when designing a particular system.

Thus, there is a continuing need for alternate ways to transfer information.

BRIEF DESCRIPTION OF THE DRAWINGS

The subject matter regarded as the invention is particularly pointed out and distinctly claimed in the concluding portion of the specification. The present invention, however, both as to organization and method of operation, together with objects, features, and advantages thereof, may best be understood by reference to the following detailed description when read with the accompanying drawings in which:

Figure 1:
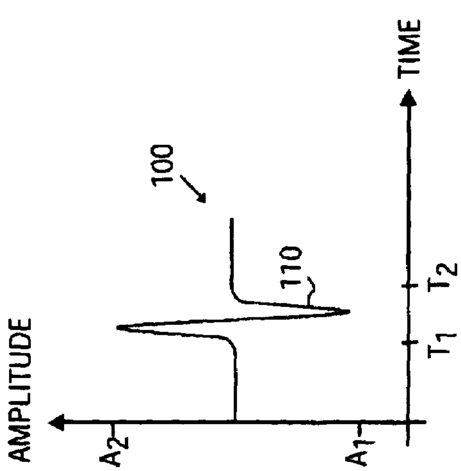
FIG. 1 is a diagram illustrating a waveform in the time domain in accordance with an embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the present invention. However, it will be understood by those skilled in the art that the present invention may be practiced without these specific details. In other instances, well-known methods, procedures, components and circuits have not been described in detail so as not to obscure the present invention.

Embodiments of the present invention may include an apparatus for performing the operations herein. This apparatus may be specially constructed for the desired purposes, or it may comprise a general purpose computing device selectively activated or reconfigured by a program stored in the device. Such a program may be stored on a storage medium, such as, but is not limited to, any type of disk including floppy disks, optical disks, CD-ROMs, magnetic-optical disks, electromechanical disks, read-only memories (ROMs), random access memories (RAMs), electrically programmable read-only memories (EPROMs), electrically erasable and programmable read only memories (EEPROMs), flash memory, magnetic or optical cards, or any other type of media suitable for storing electronic instructions and data.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Turning to FIG. 1, a diagram illustrating a waveform 100 in the time domain is illustrated. TIME is denoted along the x-axis and AMPLITUDE is denoted along the y-axis.

In this diagram, waveform 100 may be referred to as a Gaussian monocycle signal 110. That is, waveform 100 includes a single-cycle, sinusoidal signal and may be referred to simply as a monocycle signal. Monocycle signal 110 may also be generally referred to as an impulse, a pulsed signal, a pulse signal, a wideband radio frequency (RF) signal, a RF impulse signal, a RF pulse signal, a pulsed RF signal, or an ultrawideband (UWB) signal. More specifically, monocycle signal 110 may be referred to as a monocycle pulse or a monopulse signal. Various other terms may also be used to refer to monocycle signal 110. Monocycle signal 110 has a pulse width or duration of $T_2$–$T_1$ and a maximum amplitude of $A_2$ and a minimum amplitude of $A_1$.

Figure 2:
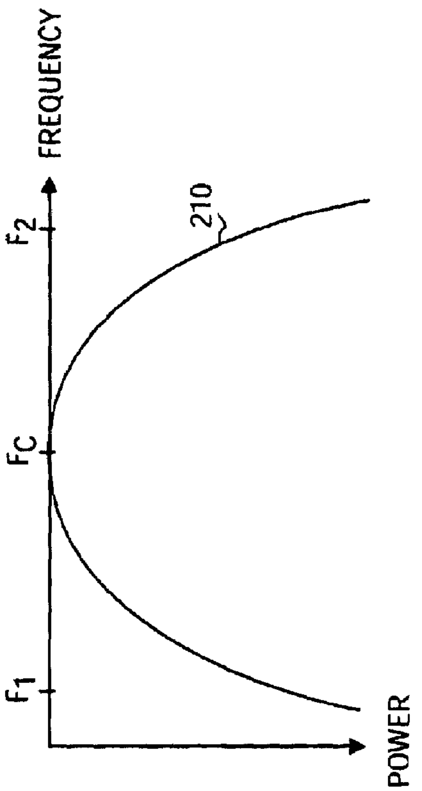
FIG. 2 is a diagram illustrating the waveform of FIG. 1 in the frequency domain in accordance with an embodiment of the present invention.

Turning to FIG. 2, a diagram of the waveform of FIG. 1 in the frequency domain is illustrated (referred to as signal 210). The center frequency (labeled Fc) and the bandwidth ($F_2$–$F_1$) of signal 210 may be dependent upon the duration of monocycle signal 110. In some embodiments, the center frequency of a monocycle signal may be approximately equal to the reciprocal of its duration and the bandwidth may be approximately 160% of the center frequency. For example, if monocycle signal 110 has a duration of about 0.5 nanoseconds (ns) in the time domain, then the center frequency of monocycle signal 110 in the frequency domain may be about 2.0 gigahertz (GHz) and the bandwidth of monocycle signal 110 in the frequency domain may be about 3.2 GHz, although the scope of the present invention is not limited in this respect.

A wireless communication system may transfer one or more bits of information using monocycle signal 110. Or alternatively, a system may use a pulse train, which includes multiple monocycle signals, to transfer one bit of information.

It should be noted that herein that the terms data and information may be used interchangeably. In addition, the terms information and data may refer to a single bit of information or may refer to more than one bit of information.

It should be noted that an ideal Gaussian monocycle signal 110 is illustrated in FIG. 1. However, in practice, rather than using an ideal Gaussian monocycle signal to transfer information, a non-ideal monocycle signal (not shown) may be used to transfer information in a communication system. In the frequency domain, a non-ideal monocycle signal may have a reduced bandwidth compared to an ideal monocycle signal.

Figure 3:
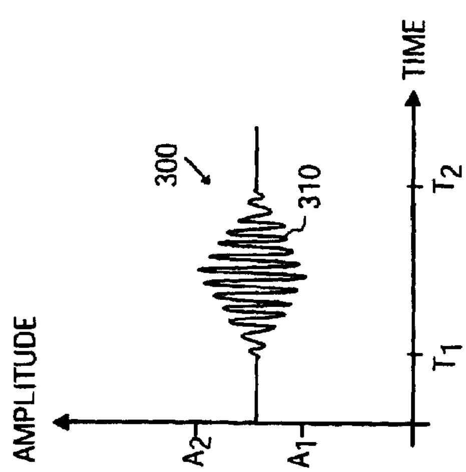
FIG. 3 is a diagram illustrating a waveform in the time domain in accordance with an embodiment of the present invention.

Turning to FIG. 3, a diagram illustrating a waveform 300 in the time domain is illustrated. TIME is denoted along the x-axis and AMPLITUDE is denoted along the y-axis.

Waveform 300 may be referred to as a multicycle signal 310. That is, multicycle signal 310 is a multiple cycle sinusoidal signal and may be a time-limited segment of an underlying sinusoid that includes several (e.g., two or more) cycles of the sinusoid. In some embodiments, a multicycle signal may be several cycles of a sine wave with an envelope. Although the scope of the present invention is not limited in this respect, multicycle signal 310 may be damped at the beginning and at the end of the segment, creating a shaped envelope for multicycle signal 310 as shown in FIG. 3. Multicycle signal 310 may be generated by a sustained burst of energy at a single frequency. A multicycle signal may refer to a pulse that consists of a burst of cycles, whereas a monocycle signal may refer to a pulse having less than two cycles. Multicycle signal 310 has a pulse width or duration of $T_2$–$T_1$ and a maximum amplitude of $A_2$ and a minimum amplitude of $A_1$.

Multicycle signal 310 may be generally referred to as an impulse, a pulsed signal, a pulse signal, a wideband radio frequency (RF) signal, a RF impulse signal, a RF pulse signal, a pulsed RF signal, or a UWB signal. More specifically, multicycle signal 310 may be referred to as a non-monocycle signal, a burst signal, a tone signal, a tone-burst signal, a multipulse signal, or a subband pulse signal. Various other terms may also be used to refer to multicycle signal 310.

Figure 4:
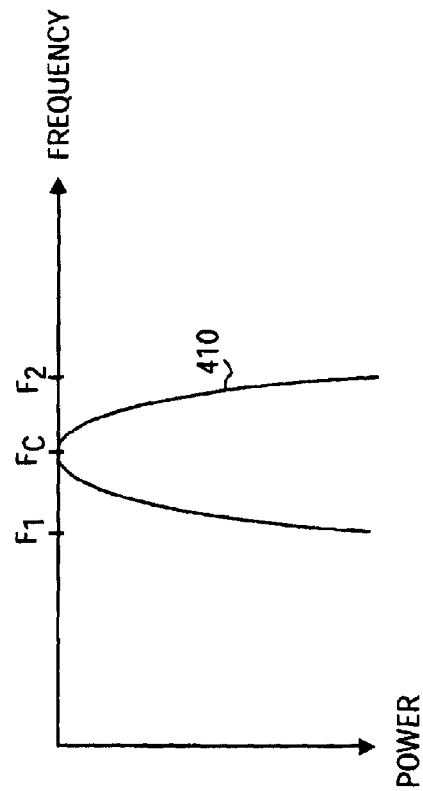
FIG. 4 is a diagram illustrating the waveform of FIG. 3 in the frequency domain in accordance with an embodiment of the present invention.

Turning to FIG. 4, a diagram of the waveform of FIG. 3 in the frequency domain is illustrated (referred to as signal 410). The center frequency (labeled Fc) and the bandwidth ($F_2$–$F_1$) of signal 410 may be dependent upon the duration of multicycle signal 310. In some embodiments, the center frequency of a monocycle signal may be approximately equal to the reciprocal of its duration and the bandwidth may be approximately 160% of the center frequency. For example, if multicycle signal 410 has a duration of about 2 nanoseconds (ns) in the time domain, then the center frequency of monocycle signal 110 in the frequency domain may be about 500 megahertz (MHz) and the bandwidth of monocycle signal 110 in the frequency domain may be about 800 MHz, although the scope of the present invention is not limited in this respect.

Although the same amplitude, time, and frequency designations (e.g., $T_1$, $T_2$, $A_1$, $A_2$, $F_1$, $F_2$, $F_c$) are used in FIGS. 1–4, these designations may correspond to different times, amplitudes, and frequencies.

A wireless communication system may transfer one or more bits of information using multicycle signal 310. Or alternatively, a system may use a pulse train, which includes multiple multicycle signals, to transfer one bit of information.

Information may be communicated or transferred between two devices by modulating multicycle signal 310 or monocycle signal 110. By varying the amplitude, polarity, timing or other characteristic of monocycle signal 110, information may be coded using monocycle signal 110. One timing modulation scheme, which may be referred to as time shifting or pulse position modulation, may include moving the position of the pulse in time relative to a nominal position. Similarly, varying the amplitude, polarity, timing or other characteristic of multicycle signal 310 may be used to modulate multicycle signal 310.

Figure 5:
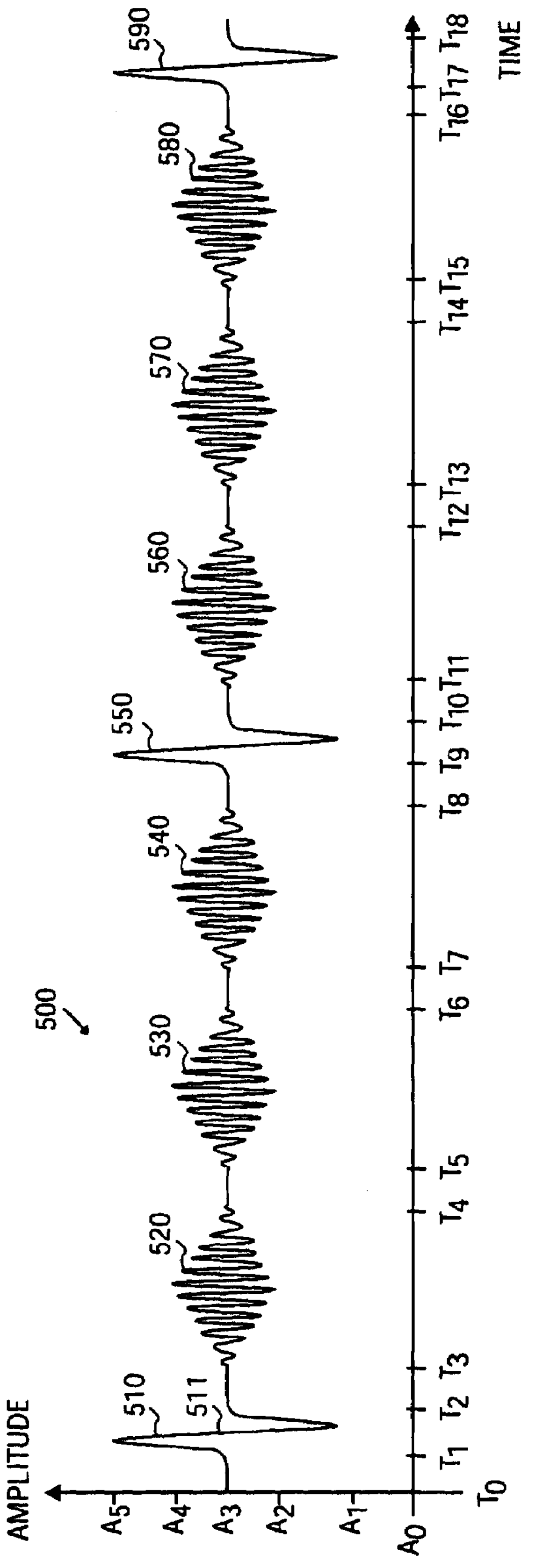
FIG. 5 is a diagram illustrating a waveform in the time domain in accordance with an embodiment of the present invention.

FIG. 5 is a diagram illustrating a waveform 500 in the time domain in accordance with an embodiment of the present invention. Waveform 500 may be referred to as a hybrid waveform or a combined waveform that includes a monocycle signal 510, respectively followed by multicycle signals 520, 530, and 540. Waveform 500 may further include a monocycle signal 550 following multicycle signal 540; multicycle signals 560, 570, and 580 following monocycle signal 550; and monocycle signal 590 following multicycle signal 590. Waveform 500 may be used in a UWB communication system and may be generally referred to as a UWB waveform.

Wireless communication systems that transfer information using waveform 100 (FIG. 1), waveform 300 (FIG. 3), or waveform 500 (FIG. 5) may be referred to as ultrawideband (UWB) systems. Various other terms may be used to refer to transmission systems using waveforms 100, 300, or 500. For example, a communication system using waveforms 100, 300, or 500 may be referred to as a carrierless, baseband, impulse radio (IR), or impulse-based system.

Turning back to FIG. 5, in this embodiment, monocycle signals 510, 550, and 590 may have maximum amplitudes of about $A_5$ and minimum amplitudes of about $A_1$. Multicycle signals 520, 530, 540, 560, 570, and 580 may have maximum amplitudes of about $A_4$ and minimum amplitudes of about $A_2$. In this embodiment, the maximum amplitude of monocycle signal 510 may be greater than the maximum amplitudes of multicycle signals 520, 530, 540, 560, 570, and 580 and the minimum amplitude of monocycle signal 510 may be less than the minimum amplitudes of multicycle signals 520, 530, 540, 560, 570, and 580.

Although the scope of the present invention is not limited in this respect, in the embodiment illustrated in FIG. 5, the duration ($T_2$–$T_1$) of monocycle signal 510 may be approximately equal to the duration ($T_{10}$–$T_9$) of monocycle signal 550 and approximately equal to the duration ($T_{18}$–$T_{17}$) of monocycle signal 590. The duration of multicycle signals 520, 530, 540, 560, 570, and 580 may be approximately equal to each other. In addition, in this embodiment, the duration of monocycle signals 510, 550, and 590 may be less than the durations of multicycle signals 520, 530, 540, 560, 570, and 580.

In one embodiment, a wireless communication system may transfer one or more bits of information between two devices using waveform 500. For example, a bit of information may be transferred using monocycle signal 510 and another bit of information may be transferred using multicycle signal 520. In addition, seven other bits of information may be transferred using signals 530, 540, 550, 560, 570, 580, and 590, respectively. Alternatively, in other embodiments, a single bit of information may be transferred from a device using more than one monocycle signal of waveform 500 (e.g., monocycle signals 510, 550, and 590). In addition, a single bit of information may be transferred from a device using more than one multicycle signal of waveform 500 (e.g., multicycle signals 520, 530, 540, 560, 570, and 580).

It should be noted that although waveform 500 is illustrated as having only three monocycle signals, that this is not a limitation of the present invention. In alternate embodiments, waveform 500 may include more or less than three monocycle signals. Similarly, although waveform 500 is illustrated as having only six multicycle signals, this is not a limitation of the present invention. In alternate embodiments, waveform 500 may include more or less than six multicycle signals. In one embodiment, a UWB waveform may include a monocycle signal followed by ten multicycle signals (10-to-1 ratio), then followed by another monocycle signal, and finally followed by ten multicycle signals.

Figure 6:
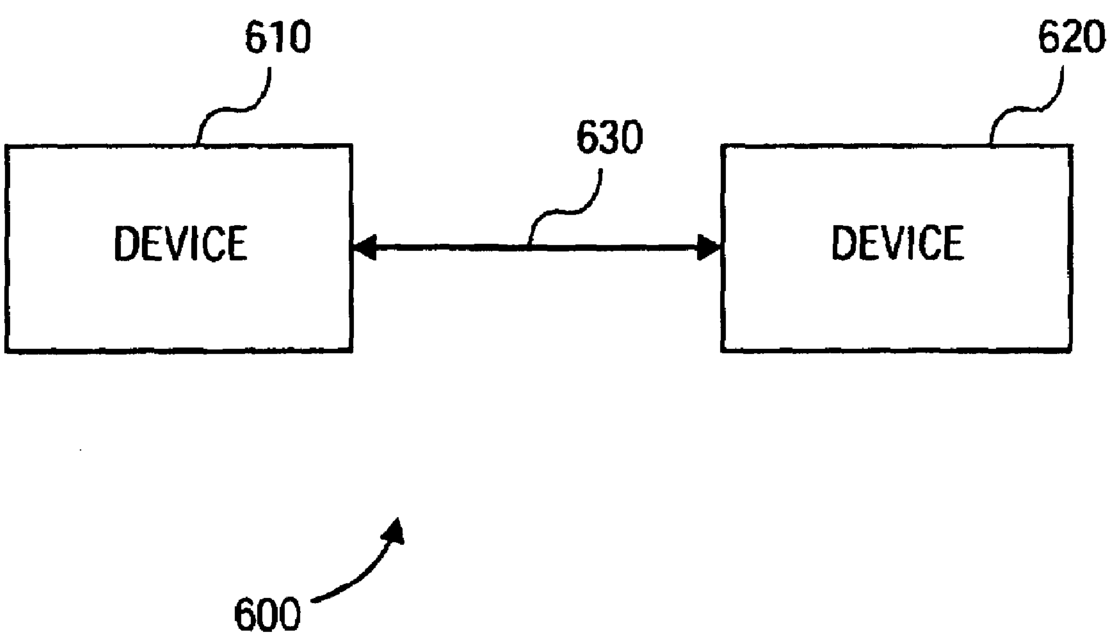
FIG. 6 is a block diagram illustrating a portion of a communication system in accordance with an embodiment of the present invention.

Turning to FIG. 6, a simplified block diagram of a portion of a communication system 600 is illustrated. System 600 may be a wireless system, and information may be transferred between a communication devices 610 and 620 via a bidirectional communication link 630. Devices 610 and 620 may be wireless devices and communication link 630 may be an air interface and may represent one or more communication channels or paths between devices 610 and 620. Devices 610 and 620 may include wireless transceivers (not shown) and antennas (not shown) to transfer information using radio frequency (RF) signals. Devices 610 and 620 may be access points (AP), personal digital assistants (PDAs), laptop and portable computers with wireless capability, web tablets, wireless telephones, wireless headsets, pagers, instant messaging devices, digital music players, digital cameras, or other devices that may be adapted to transmit and/or receive information wirelessly.

Device 610 may be adapted to process a UWB waveform such as, for example, waveform 100, waveform 300, waveform 500 (discussed above with reference to FIG. 5), waveform 800 (discussed below with reference to FIG. 8), or waveform 900 (discussed below with reference to FIG. 9). In some embodiments, a UWB waveform may refer to an RF signal having a bandwidth of more than about 20% of its center frequency. In other embodiments, a UWB waveform may refer to an RF signal having a bandwidth of at least about 500 MHz.

Device 610 may be adapted to combine monocycle and multicycle signals to transfer information from device 610 to device 620. In one embodiment, device 610 may include a waveform generator (not shown) capable of generating waveform 500 of FIG. 5 to transfer information from device 610 to device 620. Device 620 may be adapted to process a UWB waveform such as, for example, waveform 500 (FIG. 5), waveform 800 (FIG. 8), or waveform 900 (FIG. 9). For example, device 620 may include detector and decode circuitry (not shown) adapted to receive and recover the information transmitted from device 610.

In some embodiments, devices 610 and 620 may be part of a wireless local area network (WLAN) and adapted to communicate information using wideband RF signals at distances of less than about 100 meters (m), although the scope of the present invention is not limited in this respect. As an example, in one embodiment a WLAN system may include a computer having a WLAN adapter card and a base station hooked up to a fixed-line network. The WLAN may be used to establish a radio connection over a distance up to about 100 meters between the base station and the computer. In other embodiments, devices 610 and 620 may be part of a wireless personal area network (WPAN) and adapted to communicate information using wideband RF signals at distances of less than about 10 meters.

Referring to both FIGS. 5 and 6, in some embodiments, monocycle signals 510, 550, and 590 of waveform 500 may be used to transfer one type of information between devices 610 and 620 and multicycle signals 520, 530, 540, 560, 570, and 580 of waveform 500 may be used to transfer another type of information between devices 610 and 620. For example, in one embodiment, user information may be transferred between devices 610 and 620 using multicycle signals 520, 530, 540, 560, 570, and 580 of waveform 500 and control, timing, or security information may be transferred between devices 610 and 620 using monocycle signals 510, 550, and 590 of waveform 500.

Examples of user information may include spreadsheet, word processing, video, audio, picture, email, or web page information, although the scope of the present invention is not limited in this respect. Examples of control and timing information may include information to set up a communication path, information to tear down a communication path, synchronization information, information for multiple access coordination, information for data rate adaptation, and information to determine communication link quality between two devices, although the scope of the present invention is not limited in this respect. Examples of security information include authorization, authentication, and secure key exchange for encryption information.

As an example, in one embodiment, in order to tear down a communication path, one or more of the monocycle signals of waveform 500 may be used to signal the end of a transmission. In order to set up a communication path, a receiving device may use one or more monocycle signals of waveform 500 to establish a receiver clock at the correct frequency and synchronous to the pulse arrival time. In order to synchronize communication between devices 610 and 620, a single monocycle pulse of waveform 500 may be used to "fire" or "trigger" a precision oscillator in the receiving device (e.g., device 620). In alternate embodiments, the receiving device may use a phase locked loop (PLL) or other timing device to receive several (e.g., more than two) monocycle signals and get the receive clock in synch.

Although the scope of the present invention is not limited in this respect, in one embodiment, communication link quality may be determined using a quality parameter such as, for example, bit-error-rate (BER). In this embodiment, the BER of the information transmitted using the monocycle pulses of waveform 500 is monitored to determine quality of the communication link. If the BER is determined to be above a predetermined threshold level, then a signal may be transmitted from the receiving device (e.g., 620) to the transmitting device (e.g., 610) to command the transmitting device to adjust the transmission data rate for both information transmitted using the monocycle signals and information transmitted using the multicycle signals. In other words, if the communication link quality is below a predetermined threshold, then the transmission rates for both information transmitted using the monocycle signals and information transmitted using the multicycle signals may be adjusted. In one embodiment, the transmission data rate may be reduced by, for example, sending double the number of multicycle signals per bit. The receiving device can then integrate the multicycle signals and thus improve the signal-to-noise ratio. The doubling of multicycle signals may continue if the signal degrades again so that more multicycle signals may be integrated per bit to improve the BER.

Although the scope of the present invention is not limited in this respect, in one embodiment, the monocycle signals of waveform 500 may be used to establish a supervisory side channel for communications path set-up, communications path tear-down, multiple access coordination, data rate adaptation, or determination of a communication link quality parameter. The supervisory side channel may also be used to transfer authorization, authentication, or secure key exchange for encryption. In addition, the supervisory side channel may be used for performance monitoring, location sensing, or as a backup user data channel.

The relatively shorter duration, higher amplitude monocycle signals of waveform 500 may be used to determine location of a receiving device (e.g., device 620) or used to determine distance between two devices (e.g., devices 610 and 620).

In some embodiments, waveform 500 may be used to transfer one type of information between devices 610 and 620 using one data rate and to transfer another type information between devices 610 and 620 using another data rate. For example, a relatively low-speed channel may be established using monocycle signals 510, 550, and 590 of waveform 500 and a relatively higher-speed channel may be established using multicycle signals 520, 530, 540, 560, 570, and 580 of waveform 500.

If each multicycle signal of waveform 500 has a relatively greater duration than monocycle signals 510, 550, and 590, then the multicycle signals of waveform 500 may occupy a relatively smaller portion of the total spectrum in the frequency domain compared to monocycle signals 510, 550, and 590. Cycling through several different underlying sinusoids (e.g., 3.5, 4.0, 4.5 GHz, etc.) in successive multicycle signals allows multipath echoes from each multicycle signal to "die out" before attempting to use that portion of the spectrum again. Accordingly, the multicycle signals may allow mitigation of multipath, which may allow higher data rates. In one embodiment, each multicycle signal of waveform 500 may use less than about one gigahertz of spectrum centered around the frequency of the underlying sinusoid, wherein the monocycle signals of waveform 500 may use wider portions of the spectrum with every monocycle signal using at least about two gigahertz.

In one embodiment, information may be transferred between devices 610 and 620 at a data rate of at least about 100 megabits per second using the multicycle signals of waveform 500 and information may be transferred between devices 610 and 620 at a relatively lower data rate of less than about 100 kilobits per second using the monocycle signals of waveform 500.

In some embodiments, one communication path or channel may be established to transfer information between devices 610 and 620 at a relatively lower data rate using the monocycle pulses of waveform 500 and another communication path or channel may be established to transfer information between devices 610 and 620 at a relatively higher data rate using the multicycle pulses of waveform 500.

Stated generally, the embodiment illustrated in FIG. 5 provides a method to communicate information by transferring information between two devices using a combined waveform (e.g., waveform 500) that includes at least two sinusoidal signals (e.g., signals 510 and 520) wherein one sinusoidal signal (e.g., signal 520) has more cycles or zero-crossings than the other sinusoidal signal (e.g., signal 520). In this embodiment, signal 510 has one cycle and one zero-crossing (labeled 511) and signal 520 has more than one cycle and more than one zero-crossing. In some embodiments, the duration of signal 520 may be at least about two times greater than the duration of the signal 510, although the scope of the present invention is not limited in this respect.

Although the embodiment illustrated in FIG. 5 shows single monocycle signals followed by multiple multicycle signals (i.e., waveform 500 includes signal monocycle signals interleaved with multiple multicycle signals), that this is not a limitation of the present invention. In alternate embodiments, a combined waveform may include multiple monocycle signals followed by multiple multicycle signals, and this sequence may be repeated.

The frequencies, amplitudes, timing, and waveform shapes of waveform 500 may be varied depending on system-level considerations including desired data rates, path lengths, number of users, likely interference conditions from other wireless sources, multipath environment, and other factors. Similarly, many modulation schemes may be used for the signals of waveform 500 including on-off keying, amplitude modulation, bipolar modulation, polarity modulation, or pulse position modulation, although the scope of the presentation invention is not limited in this respect.

Figure 7:
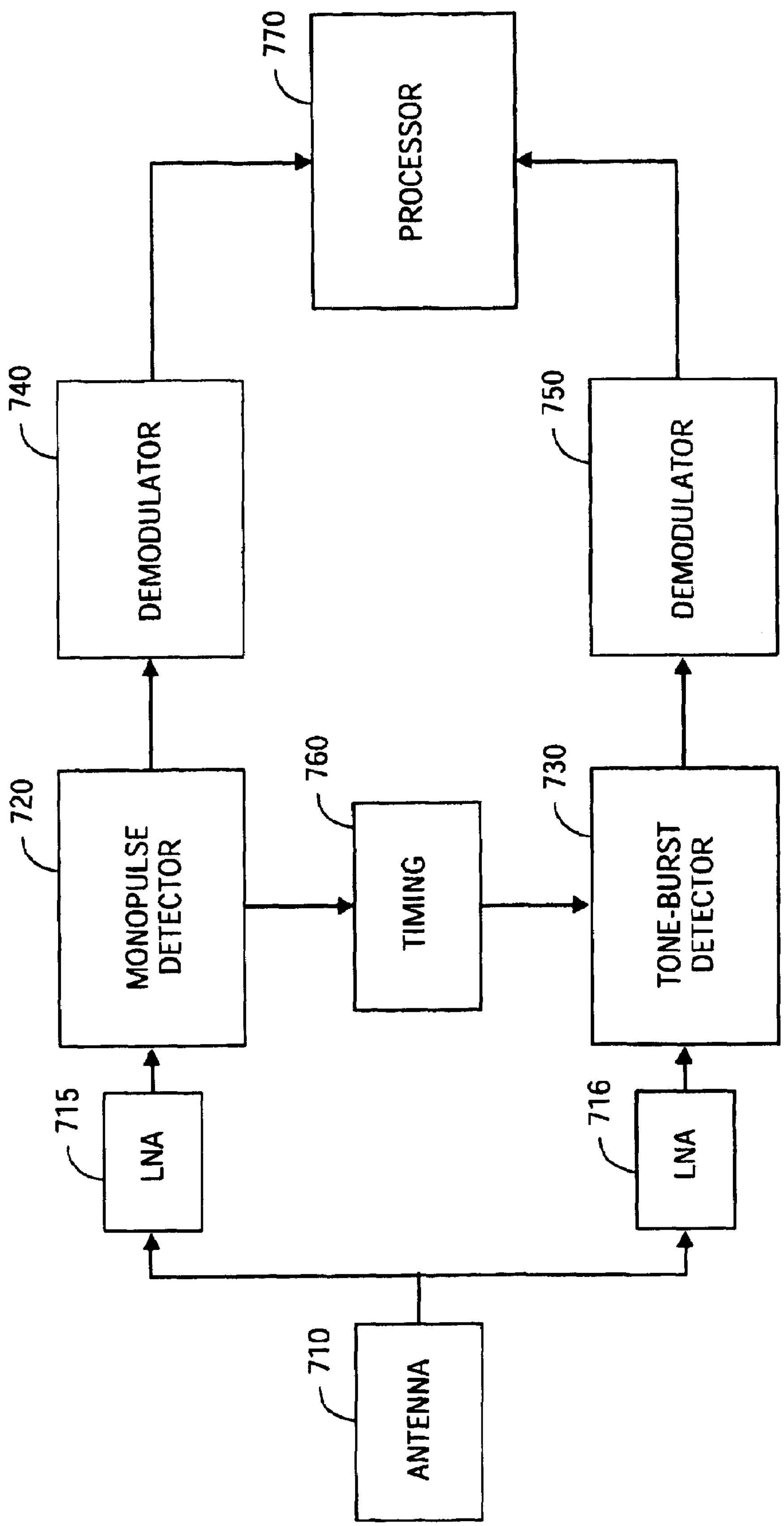
FIG. 7 is a block diagram illustrating a circuit in accordance with an embodiment of the present invention.

Turning to FIG. 7, a receiver 700 in accordance with an embodiment of the present invention is described. Receiver 700 may be part of a transceiver of communication devices 610 or 620 (FIG. 6) or may be part of a stand-alone receiver. Receiver 700 may be a portion of an integrated circuit (IC) or may comprise more than one integrated circuit. Receiver 700 may be a UWB receiver and may be adapted to process (e.g., receive, detect, and decode) UWB waveforms such as, for example, waveforms 100 (FIG. 1), 300 (FIG. 3), or 500 (FIG. 5). Receiver 700 may also be referred to as a baseband circuit.

Received UWB waveforms transferred to receiver 700 may include monopulse signals similar to monocycle signals 510, 550, and 590 (FIG. 5) and may include tone-burst signals similar to multicycle signals 520, 530, 540, 560, 570, or 580 (FIG. 5). Similar to what was described above, in one embodiment, the monopulse signals of the received UWB waveform may be used to transfer control, timing, and security information to receiver 700 from a transmitting device. The tone-burst signals of the received UWB waveform may be used to transfer user information to receiver 700 from a transmitting device.

Receiver 700 may include an antenna 710 to receive radiated radio frequency (RF) signals generated using UWB waveforms, such as, for example waveform 500. Antenna 710 may comprise one or more antennas, and may be, for example, a dipole antenna, a monopole antenna, a loop antenna, a microstrip antenna, although the scope of the present invention is not limited in this respect.

Receiver 700 may further include low-noise amplifiers (LNA) 715 and 716 connected to antenna 710. In addition, receiver 700 may include a monopulse detector 720 connected to LNA 715 and a tone-burst detector 730 connected to LNA 716. A received signal may be sent to both LNAs 715 and 716 for processing. In alternate embodiments, a single LNA and detector may be used to receive and process received UWB signals.

Monopulse detector 720 and tone-burst detector 730 may be adapted to detect UWB signals by different techniques such as, for example, band-pass filtering, down-conversion to an intermediate frequency (IF), amplitude detection, or direct sampling, although the scope of the present invention is not limited in this respect. Monopulse detector 720 may also be referred to as a monocycle detector and tone-burst detector 730 may also be referred to as subband detector or a multipulse detector.

In one embodiment, monopulse detector 720 may include a correlator (not shown) or a matched filter (not shown) adapted to detect monopulse signals such as, for example, monocycle signals 510, 550, and 590 of waveform 500 (FIG. 5). A matched filter may be a device having an impulse response matched to the pulse shape of a received wideband RF signal and may produce an impulse at its output when presented with RF energy which has a matching pulse shape.

Monopulse detector 720 may further include an integrator (not shown) to integrate multiple monopulse signals to recover the transmitted information.

In one embodiment, tone-burst detector 730 may include a correlator (not shown) or a matched filter (not shown) adapted to detect tone-burst signals such as, for example, multicycle signals 520, 530, 540, 560, 570, or 580 of waveform 500 (FIG. 5). Tone-burst detector 730 may further include an integrator (not shown) to integrate multiple tone-burst signals to recover the transmitted information.

Demodulator 740 may be adapted to demodulate the monopulse signals of the received UWB waveform to recover the transmitted information in the received signal. Demodulator 750 may be adapted to demodulate the tone-burst signals of the received UWB waveform to recover the transmitted information in the received signal.

In one embodiment, timing 760 may generate a clock signal from the monopulse signals of the received UWB waveform and provide this clock signal to tone-burst detector 730, wherein tone-burst detector 730 may use the clock signal from timing 760 as a clock to process tone-burst signals. The clock signal generated by timing 760 may be synchronized with a transmitting device that generated the received UWB waveform. For example, timing 760 may include a PLL, and the monopulse signals of the received UWB waveform may be used as an input clock signal to the PLL. The PLL may generate an output clock signal that is synchronized with the transmitting device. Stated generally, the monopulse signals of the received UWB waveform may be used to process the multicycle signal by generating a clock from the monopulse signals and providing this clock to tone-burst detector 730, which is adapted to detect the tone-burst signals of the received UWB waveform.

Processor 770 may comprise, for example, one or more microprocessors, digital signal processors (DSP), microcontrollers, or the like. Generally, processor 770 may be used to process the received UWB waveforms. In one embodiment, if user information is transferred to receiver 700 using the tone-burst signals of the received UWB waveform, then processor 770 may be used to process the received user information. Processor 770 may also be used to assist in the processing of the received UWB waveform to determine distance and location information and to perform rate adaptation.

In one embodiment, processor 770 may be adapted to process the monopulse signals of a received UWB waveform to determine the quality of the communication link between receiver 700 and a transmitting device that generated the UWB waveform. For example, the BER of the information transmitted using the monopulse signals of the received UWB may be monitored by processor 770 to determine quality of the communication link. If the BER is determined to be above a predetermined threshold level, then a signal may be transmitted from receiver 700 to the transmitting device to command the transmitting device to reduce the transmission data rate for both information transmitted using the monopulse signals and information transmitted using the tone-burst signals.

In one embodiment, processor 770 may be adapted to process the monopulse signals of a received UWB waveform to determine distance information from a transmitting device or location information of the receiving device. Processor 770 may be used to determine the time of arrival (referred to as a "time stamp") of the monopulse signals of the received UWB waveform. In one embodiment, if three "time stamps" are determined, then processor 770 may determine the X, Y, and Z location of the transmitting device.

Although receiver 700 is illustrated as having several separate functional elements, one or more of the functional elements may be combined and may be implemented by combinations of software configured elements such as, for example, processors including digital signal processors (DSPs) and microcontrollers.

Figure 8:
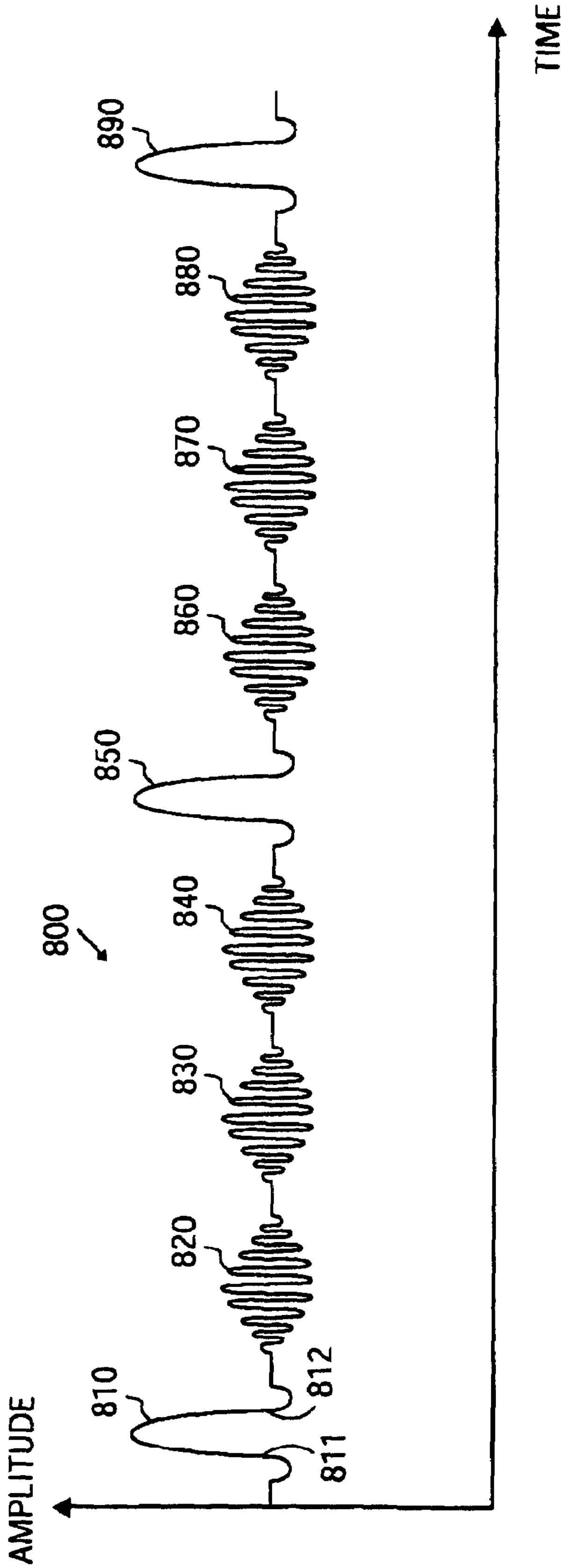
FIG. 8 is a diagram illustrating a waveform in the time domain in accordance with an embodiment of the present invention.

Turning to FIG. 8, a waveform 800 is illustrated. Waveform 800 may include a sinusoidal signal 810, respectively followed by sinusoidal signals 820, 830, 840, 850, 860, 870, 880, and 890. Waveform 800 may be referred to as a UWB waveform.

In one embodiment, waveform 800 has two types of signals having different durations. Signals 810, 850, and 890 may be designated as one type of signal and signals 820, 830, 840, 860, 870, and 880 may be designated as another type of signal. Signals 810, 850, and 890 may have relatively shorter time durations compared to signals 820, 830, 840, 860, 870, and 880. The durations of signals 810, 850, and 890 may be approximately equal to each other; the durations of signals 820, 830, 840, 860, 870, and 880 may be approximately equal to each other; and the durations of signals 810, 850, and 890 may be each relatively less than the durations of 820, 830, 840, 860, 870, and 880. The duration of signals 820, 830, 840, 860, 870, and 880 may be substantially longer compared to the durations of signals 810, 850, and 890, e.g., the duration of signal 820 may be at least two times as long as the duration of signal 810. In another embodiment, the duration of signal 820 may be at least ten times (10-to-1 ratio) as long as the duration of signal 810, although the scope of the present invention is not limited in this respect.

In the embodiment illustrated in FIG. 8, sinusoidal signals 820, 830, 840, 860, 870, and 880 have more zero-crossings and cycles compared to signals 810, 850, and 890. In this embodiment, signal 810 has two zero-crossings (labeled 811 and 812) and less than two cycles. Signals 850 and 890 may also have two zero-crossings and less than two cycles. Each of signals 820, 830, 840, 860, 870, and 880 may have at least two cycles and at least three zero-crossings.

Signals 810, 820, 830, 840, 850, 860, 870, 880, 890 may be generally referred to as an impulse, a pulsed signal, a pulse signal, a wideband RF signal, a RF impulse signal, a RF pulse signal, a pulsed RF signal, or a UWB signal. Signals 810, 850, and 890 may be also be referred to as monopulse signals. Signals 820, 830, 840, 860, 870, and 880 may be also be referred to as multicycle signals, multipulse signals, or subband pulse signals, burst signals, tone signals, or tone-burst signals. Referring briefly back to FIG. 7, detector 730 may be adapted to detect signals 820, 830, 840, 860, 870, and 880 of waveform 800 and detector 720 may be adapted to detect signals 810, 850, and 890 of waveform 800.

Turning back to FIG. 8, in one embodiment, the repetition frequency of the different types of signals of waveform 800 may vary. For example, waveform 800 may include fewer relatively shorter duration signals having fewer zero-crossings compared to a greater number of relatively longer duration signals having a greater number of zero-crossings. In the embodiment illustrated in FIG. 8, waveform 800 includes more longer duration signals than shorter duration signals. That is, waveform 800 includes three relatively shorter duration signals (e.g., signals 810, 850, and 890) and six relatively longer duration signals (e.g., signals 820, 830, 840, 860, 870, and 880), although the scope of the present invention is not limited in this respect. In other embodiments, waveform 800 may include more or fewer relatively shorter duration signals and may include more or fewer relatively longer duration signals.

Waveform 800 may be used to transfer information. In one embodiment, two types of signals of different durations may be used to transfer information in a communication system. For example, a UWB communication system may be implemented using waveform 800, wherein the relatively fewer, shorter duration signals (e.g., signals 810, 850, and 890) of waveform 800 may be used to transfer control, timing, security, and backup user information and the relatively greater number of longer duration signals may be used to transfer user information. In one embodiment, synchronization, connection setup and tear-down, rate adaptation, performance monitoring, location sensing, or backup user information may be performed using the relatively fewer, shorter duration signals (e.g., signals 810, 850, and 890) of waveform 800. The transfer of user information may be performed using the relatively longer duration signals (e.g., signals 820, 830, 840, 860, 870, and 880) of waveform 800.

Figure 9:
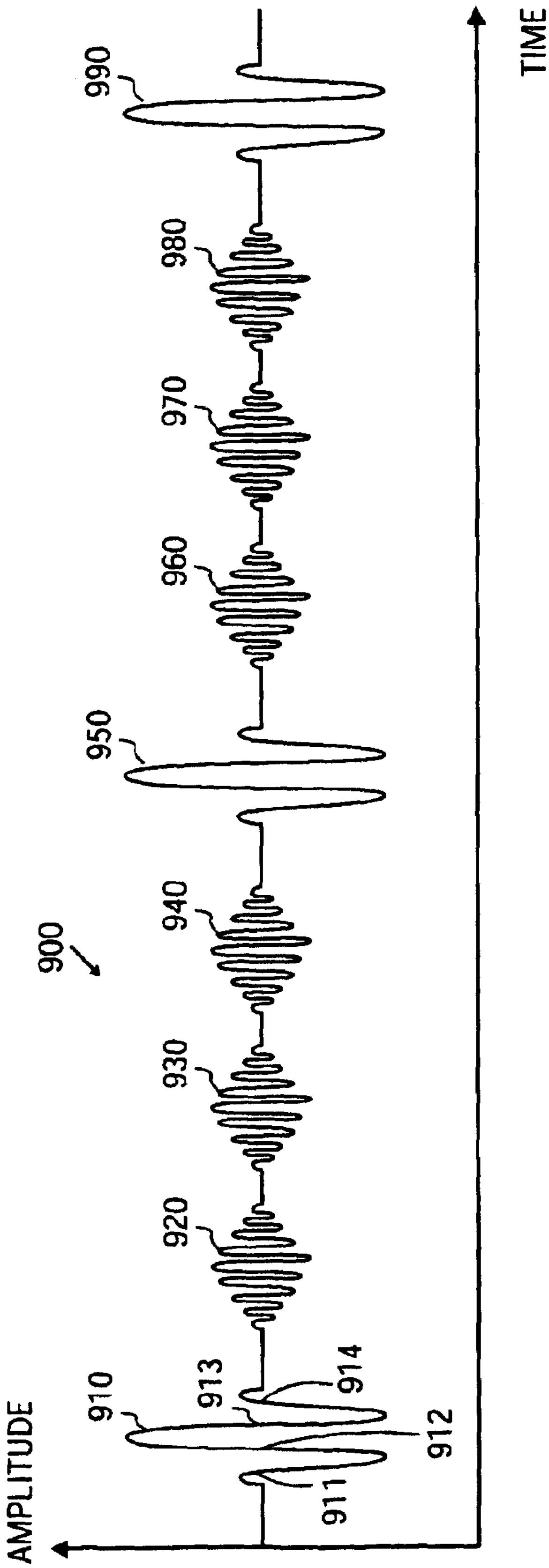
FIG. 9 is a diagram illustrating a waveform in the time domain in accordance with an embodiment of the present invention.

Turning to FIG. 9, a waveform 900 is illustrated. Waveform 900 may include a sinusoidal signal 910, respectively followed by sinusoidal signals 920, 930, 940, 950, 960, 970, 980, and 990. Waveform 900 may be referred to as a UWB waveform.

In one embodiment, waveform 900 has two types of signals having different durations. Signals 910, 950, and 990 may be designated as one type of signal and signals 920, 930, 940, 960, 970, and 980 may be designated as another type of signal. Signals 910, 950, and 990 may have relatively shorter time durations compared to signals 920, 930, 940, 960, 970, and 980. The durations of signals 910, 950, and 990 may be approximately equal to each other; the durations of signals 920, 930, 940, 960, 970, and 980 may be approximately equal to each other; and the durations of signals 910, 950, and 990 may be each relatively less than the durations of 920, 930, 940, 960, 970, and 980. The duration of signals 920, 930, 940, 960, 970, and 980 may be substantially longer compared to the durations of signals 910, 950, and 990, e.g., the duration of signal 920 may be at least two times as long as the duration of signal 910. In another embodiment, the duration of signal 920 may be at least ten times (10-to-1 ratio) as long as the duration of signal 910, although the scope of the present invention is not limited in this respect.

In the embodiment illustrated in FIG. 9, sinusoidal signals 920, 930, 940, 960, 970, and 980 have more zero-crossings and cycles compared to signals 910, 950, and 990. In this embodiment, signal 910 has four zero-crossings (labeled 911, 912, 913, and 914) and less than three cycles. Signals 950 and 990 may also have four zero-crossings and less than three cycles. Each of signals 920, 930, 940, 960, 970, and 980 may have at least three cycles and at least five zero-crossings.

Signals 910, 920, 930, 940, 950, 960, 970, 980, 990 may be generally referred to as an impulse, a pulsed signal, a pulse signal, a wideband RF signal, a RF impulse signal, a RF pulse signal, a pulsed RF signal, or a UWB signal. Referring briefly back to FIG. 7, detector 730 may be adapted to detect signals 920, 930, 940, 960, 970, and 980 of waveform 900 and detector 720 may be adapted to detect signals 910, 950, and 990 of waveform 900.

In one embodiment, the repetition frequency of the different types of signals of waveform 900 may vary. For example, waveform 900 may include fewer relatively shorter duration signals having fewer zero-crossings compared to a greater number of relatively longer duration signals having a greater number of zero-crossings. In the embodiment illustrated in FIG. 9, waveform 900 may include more longer duration signals than shorter duration signals. That is, waveform 900 includes three relatively shorter duration signals (e.g., signals 910, 950, and 990) and six relatively longer duration signals (e.g., signals 920, 930, 940, 960, 970, and 980), although the scope of the present invention is not limited in this respect. In other embodiments, waveform 900 may include more or fewer relatively shorter duration signals and may include more or fewer relatively longer duration signals.

Waveform 900 may be used to transfer information. In one embodiment, two types of signals of different durations may be used to transfer information in a communication system. For example, a UWB communication system may be implemented using waveform 900, wherein the relatively fewer, shorter duration signals of waveform 900 may be used to transfer control, timing, security, and backup user information and the relatively greater number of longer duration signals may be used to transfer user information. In one embodiment, synchronization, connection setup and tear-down, rate adaptation, performance monitoring, location sensing, or backup user information may be performed using the relatively fewer, shorter duration signals 910, 950, and 990 of waveform 900. The transfer of user information may be performed using the relatively longer duration signals 920, 930, 940, 960, 970, and 980 of waveform 900.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method, comprising:

generating a waveform that comprises at least one monocycle signal and at least one multicycle signal, wherein a duration of the monocycle signal is less than a duration of the multicycle signal, the monocycle signal has fewer zero-crossings than the multicycle signal, and an amplitude of the monocycle signal is greater than an amplitude of the multicycle signal.

2. The method of claim 1, wherein a duration of the multicycle signal is at least about two times greater than a duration of the monocycle signal.

3. The method of claim 1, further comprising:

transferring information at a first data rate using the at least one monocycle signal; and transferring information at a second data rate using the at least one multicycle signal, wherein the first data rate is less than the second data rate.

4. The method of claim 1, further comprising:

using the at least one monocycle pulse to transfer a first type of information; and using the at least one multicycle pulse to transfer a second type of information.

5. The method of claim 4, wherein the first type of information is control, timing, or security information and wherein the second type of information is user information.

6. The method of claim 4, wherein the first type of information is authentication information, authorization information, information to set up a communication path, information to tear down a communication path, synchronization information, information for multiple access coordination, information for data rate adaptation, or information to determine communication link quality between two devices and wherein the second type of information is spreadsheet information, word processing information, email information, web page information, a video file, an audio file, or a picture file.

7. The method of claim 1, further comprising:

providing a first communication channel to transfer information at a first data rate between a first device and a second device using the at least one monocycle signal; and providing a second communication channel to transfer information at a second data rate between the first device and the second device using the at least one multicycle pulse.

8. The method of claim 7, further comprising:

determining communication link quality between the first device and the second device using the at least one monocycle signal; and altering the second data rate if the communication link quality is below a predetermined level.

9. The method of claim 1, further comprising:

detecting the monocycle signal;

detecting the multicycle signal; and processing the multicycle signal using the monocycle signal.

10. The method of claim 1, wherein generating further comprises generating the waveform that comprises the at least one monocycle signal and the at least one multicycle signal to transfer information from a first wireless device to a second wireless device.

11. The method of claim 10, further comprising synchronizing timing between the first wireless device and the second wireless device using the at least one monocycle signal.

12. The method of claim 10, further comprising:

determining a location of the second wireless device using the at least one monocycle signal.

13. The method of claim 10, further comprising:

determining a distance between the first wireless device and the second wireless device using the at least one monocycle signal.

14. A method, comprising:

transferring information between at least two wireless devices using a waveform that includes a monocycle signal and a multicycle signal, wherein the multicycle signal has more zero-crossings than the monocycle signal and wherein a duration of the monocycle signal is less than a duration of the multicycle signal.

15. The method of claim 14, further comprising:

transferring control information between the at least two wireless devices using the monocycle signal; and transferring user information between the at least two wireless devices using the multicycle signal.

16. The method of claim 14, wherein a duration of the multicycle signal is at least about two times greater than a duration of the monocycle signal and wherein an amplitude of the monocycle signal is greater than an amplitude of the multicycle signal.

17. A method, comprising:

transferring information between at least two devices using a first signal, a second signal, and a third signal, wherein a duration of the first signal is less than a duration of the second signal and the duration of the second signal is approximately equal to the duration of the third signal and wherein the first signal has fewer zero-crossings than the second signal and the third signal.

18. The method of claim 17, wherein the at least two devices are wireless devices and further comprising:

transferring control information between the at least two devices using the first signal; and transferring user information between the at least two devices using the second and third signals.

19. The method of claim 17, wherein a maximum amplitude of the first signal is greater than maximum amplitudes of the second and third signals.

20. An apparatus, comprising:

a circuit adapted to process a waveform that comprises a first pulsed signal, a second pulsed signal, and a third pulsed signal, wherein durations of the second and third pulsed signals are each greater than a duration of the first pulsed signal and wherein the second and third pulsed signals each have more zero-crossings than the first pulsed signal.

21. The apparatus of claim 20, wherein the circuit is a baseband circuit.

22. The apparatus of claim 20, wherein the circuit is a processor.

23. The apparatus of claim 20, wherein the circuit includes a first detector to detect the first pulsed signal and a second detector to detect the second and third pulsed signals.

24. The apparatus of claim 23, wherein the first detector includes a matched filter and wherein the second detector includes a matched filter.

25. The apparatus of claim 20, wherein an amplitude of the first pulsed signal is greater than amplitude of the second and third pulsed signals.

26. A system, comprising:

a wireless device adapted to wirelessly communicate information at a distance of less than about 10 meters, wherein the wireless device comprises:

a circuit adapted to process a waveform that comprises a first pulsed signal, a second pulsed signal, and a third pulsed signal, wherein durations of the second and third pulsed signals are each greater than a duration of the first pulsed signal and wherein the second and third pulsed signals each have more zero-crossings than the first pulsed signal.

27. The system of claim 26, wherein the circuit includes a first detector to detect the first pulsed signal and a second detector to detect the second and third pulsed signals.

28. The system of claim 26, wherein the wireless device includes an antenna having an output terminal coupled to an input terminal of the circuit, wherein the antenna is adapted to receive the waveform.

29. A method, comprising:

generating a waveform that comprises at least one monocycle signal and at least one non-monocycle signal;

using the at least one monocycle pulse to transfer a first type of information;

using the at least one multicycle pulse to transfer a second type of information; and wherein the first type of information is authentication information, authorization information, information to set up a communication path, information to tear down a communication path, synchronization information, information for multiple access coordination, information for data rate adaptation, or information to determine communication link quality between two devices and wherein the second type of information is spreadsheet information, word processing information, email information, web page information, a video file, an audio file, or a picture file.

* * * * *